(12) United States Patent
Xue (10) Patent No.: US 7,973,998 B2
(45) Date of Patent: Jul. 5, 2011

(54) TEMPERATURE ACTIVATED OPTICAL FILMS

(75) Inventor: Jiuzhi Xue, Broomfield, CO (US)

(73) Assignee: Serious Materials, Inc., Sunnyvale, CA (US)

( * ) Notice: Subject to any disclaimer, the term of this patent is extended or adjusted under 35 U.S.C. 154(b) by 266 days.

(21) Appl. No.: 12/152,969

(22) Filed: May 19, 2008

(65) Prior Publication Data

US 2009/0219603 A1   Sep. 3, 2009

Related U.S. Application Data (60) Provisional application No. 60/930,894, filed on May 18, 2007.

(51) Int. Cl.
*G02F 1/01* (2006.01)

(52) U.S. Cl. ........................................ 359/288; 359/289

(58) Field of Classification Search .................. 359/288
See application file for complete search history.

(56) References Cited

U.S. PATENT DOCUMENTS

| | | | |
|---|---|---|---|
| 3,279,317 A | 10/1966 | Ploke | |
| 3,711,176 A | 1/1973 | Alfrey, Jr. et al. | |
| 3,790,250 A | 2/1974 | Mitchell et al. | |
| 3,953,110 A | 4/1976 | Charoudi | |
| 3,990,784 A | 11/1976 | Gelber | |
| 4,229,066 A | 10/1980 | Rancourt et al. | |
| 4,268,126 A | 5/1981 | Mumford | |
| 4,307,942 A | 12/1981 | Chahroudi | |
| 4,401,690 A | 8/1983 | Greenburg | |
| 4,456,335 A | 6/1984 | Mumford | |
| 4,475,031 A | 10/1984 | Mockovciak | |
| RE31,780 E | 12/1984 | Cooper et al. | |
| 4,491,390 A | 1/1985 | Tong-Shen | |
| 4,512,638 A | 4/1985 | Sriram et al. | |
| 4,641,922 A | 2/1987 | Jacob | |
| 4,755,673 A | 7/1988 | Pollack et al. | |
| 4,789,500 A | 12/1988 | Morimoto et al. | |
| 4,848,875 A | 7/1989 | Baughman et al. | |
| 4,871,220 A | 10/1989 | Kohin | |
| 4,877,675 A | 10/1989 | Falicoff et al. | |

(Continued)

FOREIGN PATENT DOCUMENTS

JP      58010717      1/1983

(Continued)

OTHER PUBLICATIONS

Author Unknown, "Liquid Crystal Research", http://chirality.swarthmore.edu, printed Aug. 21, 2009.

(Continued)

*Primary Examiner* — Ricky L Mack
*Assistant Examiner* — James C Jones
(74) *Attorney, Agent, or Firm* — Wilson Sonsini Goodrich & Rosati (57) ABSTRACT

The present invention discloses a multilayer dielectric optical structure wherein one of the optical materials in the multilayer structure shows an optically isotropic state above and a birefringent state below a characteristic temperature Tc near the room temperature. The optical structure reflects a predetermined wavelength range of electromagnetic radiation above the Tc but allow the same to transmit through below the Tc. The predetermined wavelength can be the near infrared radiation from 700 nm to 2500 nm, and the optical structure rejects solar heat in warm summer days but admits the same to interior on a colder winter day.

20 Claims, 5 Drawing Sheets

Xue, J. "Temperature Activated Optical Films"

U.S. PATENT DOCUMENTS

| | | | |
|---|---|---|---|
| 4,893,902 | A | 1/1990 | Baughman et al. |
| 4,899,503 | A | 2/1990 | Baughman et al. |
| 4,964,251 | A | 10/1990 | Baughman et al. |
| 5,009,044 | A | 4/1991 | Baughman et al. |
| 5,025,602 | A | 6/1991 | Baughman et al. |
| 5,032,461 | A | 7/1991 | Shaw et al. |
| 5,071,206 | A | 12/1991 | Hood et al. |
| 5,111,629 | A | 5/1992 | Baughman et al. |
| 5,152,111 | A | 10/1992 | Baughman et al. |
| 5,193,900 | A | 3/1993 | Yano et al. |
| 5,196,705 | A | 3/1993 | Ryan |
| 5,197,242 | A | 3/1993 | Baughman et al. |
| H1182 | H | 5/1993 | Spry |
| RE34,605 | E | 5/1994 | Schrenk et al. |
| 5,308,706 | A | 5/1994 | Kawaguchi et al. |
| 5,319,478 | A | 6/1994 | Funfschilling et al. |
| 5,360,659 | A | 11/1994 | Arends et al. |
| 5,377,042 | A | 12/1994 | Chahroudt |
| 5,481,400 | A | 1/1996 | Borden |
| 5,525,430 | A | 6/1996 | Chahroudi |
| 5,574,286 | A | 11/1996 | Huston et al. |
| 5,608,995 | A | 3/1997 | Borden |
| 5,686,979 | A | 11/1997 | Weber et al. |
| 5,699,188 | A | 12/1997 | Gilbert et al. |
| 5,881,200 | A | 3/1999 | Burt |
| 5,889,288 | A | 3/1999 | Futatsugi |
| 5,897,957 | A | 4/1999 | Goodman |
| 5,940,150 | A | 8/1999 | Faris |
| 5,986,730 | A | 11/1999 | Hansen et al. |
| 6,049,419 | A | 4/2000 | Wheatley et al. |
| 6,099,758 | A | 8/2000 | Verrall et al. |
| 6,122,103 | A | 9/2000 | Perkins et al. |
| 6,218,018 | B1 | 4/2001 | McKown et al. |
| 6,281,519 | B1 | 8/2001 | Sugiyama et al. |
| 6,288,840 | B1 | 9/2001 | Perkins et al. |
| 6,294,794 | B1 | 9/2001 | Yoshimura et al. |
| 6,391,400 | B1 | 5/2002 | Russell et al. |
| 6,486,997 | B1 | 11/2002 | Bruzzone et al. |
| 6,486,999 | B1 | 11/2002 | Ackerman et al. |
| 6,493,482 | B1 | 12/2002 | Al-hemyari et al. |
| 6,504,588 | B1 | 1/2003 | Kaneko |
| 6,512,242 | B1 | 1/2003 | Fan et al. |
| 6,559,903 | B2 | 5/2003 | Faris et al. |
| 6,565,982 | B1 | 5/2003 | Quderkirk et al. |
| 6,577,360 | B1 | 6/2003 | Akiyama et al. |
| 6,583,827 | B2 | 6/2003 | Faris et al. |
| 6,624,936 | B2 | 9/2003 | Kotchick et al. |
| 6,661,482 | B2 | 12/2003 | Hara |
| 6,671,008 | B1 | 12/2003 | Li et al. |
| 6,710,823 | B2 | 3/2004 | Faris et al. |
| 6,912,018 | B2 | 6/2005 | Faris et al. |
| 6,965,420 | B2 | 11/2005 | Li et al. |
| 6,978,070 | B1 | 12/2005 | McCarthy et al. |
| 7,019,905 | B2 | 3/2006 | Weber et al. |
| 7,038,745 | B2 | 5/2006 | Weber et al. |
| 7,042,615 | B2 | 5/2006 | Richardson |
| 7,049,004 | B2 | 5/2006 | Domash et al. |
| 7,057,681 | B2 | 6/2006 | Hinata et al. |
| 7,099,062 | B2 | 8/2006 | Azens |
| 7,113,335 | B2 | 9/2006 | Sales |
| 7,166,797 | B1 | 1/2007 | Dziendziel et al. |
| 7,215,466 | B2 | 5/2007 | Chen et al. |
| 7,276,432 | B2 | 10/2007 | McCarthy et al. |
| 7,300,167 | B2 | 11/2007 | Fernando et al. |
| 7,311,976 | B2 | 12/2007 | Arnaud et al. |
| 7,525,604 | B2 | 4/2009 | Xue |
| 7,755,829 | B2 | 7/2010 | Powers et al. |
| 7,768,693 | B2 | 8/2010 | McCarthy et al. |
| 2002/0079485 | A1 | 6/2002 | Stintz et al. |
| 2002/0114367 | A1 | 8/2002 | Stintz et al. |
| 2003/0066998 | A1 | 4/2003 | Lee |
| 2004/0213314 | A1* | 10/2004 | Kunitsugu et al. ............ 372/49 |
| 2006/0011904 | A1 | 1/2006 | Snyder et al. |
| 2008/0061222 | A1 | 3/2008 | Powers et al. |
| 2008/0210893 | A1 | 9/2008 | McCarthy et al. |
| 2009/0015902 | A1 | 1/2009 | Powers et al. |
| 2009/0128893 | A1 | 5/2009 | McCarthy et al. |
| 2009/0167971 | A1 | 7/2009 | Powers et al. |
| 2009/0284670 | A1 | 11/2009 | Xue |
| 2010/0118380 | A1 | 5/2010 | Xue |
| 2010/0271686 | A1 | 10/2010 | Powers et al. |

FOREIGN PATENT DOCUMENTS

| | | |
|---|---|---|
| JP | 61223719 | 10/1986 |

OTHER PUBLICATIONS

Barbagallo, S., et al., "Synthesis of novel metamaterials," Chapter 2 (VDM Verlag 2008).

Eleftheriades, G.V., et al. (Editors), "Negative-Refraction Metamaterials," Chapter 1 and 8 (Wiley 2005), pp. 4-6, 10, 12, 16-30, 321-330.

Fedotov, V.A., et al., "Asymmetric Propagation of Electromagnetic Waves through a Planar Chiral Structure," The American Physical Society, PRL 97, Oct. 20, 2006, pp. 167401-1-167401-4.

Ginley, D.S., et al., "Transparent Conducting Oxides," MRS Bulletin, Aug. 2000, pp. 15-18.

Goldhaber-Gordon, David, et al., "Overview of Nanoelectronic Devices," Proceedings of the IEEE, vol. 85, No. 4, (Apr. 1997) pp. 521-533.

Harrison, "Quantum Wells, Wires, and Dots: Theoretical & Computational Physics of Semiconductor Nanostructures," $2^{nd}$ Edition, John Wiley & Sons, Ltd (2005), 3 pages.

Lan, S., et al., "Survey on Roller-type Nanoimprint Lithography (RNIL) Process," International Conference on Smart Manufacturing Application, Apr. 9-11, 2008, in Kintex, Gyeonggi-do, Korea, pp. 371-376.

Leatherdale, C.A., et al., "Photoconductivity in CdSe Quantum Dot Solids," Physical Review B, vol. 62, No. 4, (Jul. 15, 2000) pp. 2669-2680.

Manea, E., et al., "Optical Characterization of SnO2 Thin Films Prepared by Sol Gel Method, for 'Honeycomb' Textured Silicon Solar Cells," International Semiconductor Conference, 2006, vol. 1, Issue, Sep. 2008, pp. 179-182.

Manea, E., et al., "SnO2 Thin Films Prepared by Sol Gel Method for 'Honeycomb' Textured Silicon Solar Cells," Romanian Journal of Information Science and Technology, vol. 10, No. 1, 2007, pp. 25-33.

Padilla, W.J., et al., "Electrically resonant terahertz metamaterials: Theoretical and experimental investigations," Physical Review B 75, 041102(r) (2007).

Rogacheva, A.V., et al., "Giant gyrotropy due to electromagnetic-field coupling in a bilayered chiral structure," Physical Review Letters 97, 177401 (Oct. 27, 2006).

Siegel, J.D., "The MSVD Low E 'Premium Performance' Myth," International Glass Review, Issue 1, 2002, pp. 55-58.

Zhang, W., "Giant optical activity in dielectric planar metamaterials with two-dimensional chirality," Journal of Optics A: Pure and Applied Optics, 8, pp. 878-890 (2006).

Zhu, Xinyu, et al., "Transflective Liquid Crystal Displays", IEEE/OSA Journal of Display Technology, vol. 1, No. 1, Sep. 2005, pp. 15-29.

International Searching Authority; Korean Intellectual Property Office; International Search Report and Written Opinion of the International Authority for International Application No. PCT/US2008/069881; Sep. 30, 2008; 7 pages.

International Searching Authority; Korean Intellectual Property Office; International . Search Report and Written Opinion for International Application No. PCT/US2008/051959, Jun. 3, 2008, 10 pages.

International Searching Authority; Korean Intellectual Property Office; International Search Report and Written Opinion for International Application No. PCT/US2008/087964, Mar. 31, 2009, 11 pages.

European Search Report for European Patent Application No. 06802534.5 (Regional Phase of PCT/US2006/033646).

International search report dated May 15, 2008 for PCT Application No. US2006/033646.

International search report dated Dec. 24, 2009 for PCT Application No. US2009/44546.

US Co-pending U.S. Appl. No. 12/688,843, filed Jan. 15, 2010, Xue.

US Co-pending U.S. Appl. No. 12/430,868, filed Apr. 27, 2009, Xue.

Weber, Michael F.; Stover, Carl A.; Gilbert, Larry R.; Nevitt, Timothy J.; Ouderkirk, Andrew J.; "Giant Birefringent Optics in Multilayer Polymer Mirrors", Science; Mar. 31, 2000, vol. 287, Issue 5462.

Mori, Hiroyuki; Itoh, Yoji; Nishiura, Yosuke; Nakamura, Taku; Shinagawa, Yukio; "Performance of a Novel Optical Compensation Film Based on Negative Birefringence of Discotic Compound for Wide-Viewing-Angle Twisted Nematic Liquid-Crystal Displays", Jpn. J. Appl. Phys. vol. 36 (1997) pp. 143-147, Part 1 No. 1A, Jan. 1997.

Saitoh, Yukito; Kimura, Shinichi; Kusafuka, Kaoru; Shimizu, Hidehisa; "Optimum Film Compensation of Viewing Angle of Contract in In-Plane-Switching-Mode Liquid Crystal Display", Jpn. J. Appl. Phys. vol. 37 (1998) pp. 4822-4828 Part 1 No. 9A Sep. 1998.

Auton, J.P., "Infrared Transmission Polarizers by Photolithography", Applied Optics, Jun. 1967, vol. 6, No. 6, pp. 1023-1027.

DeVries, HL., Physical Laboratory of the University of Groningen, Netherlands "Rotatory Power and Other Optical Properties of Certain Liquid Crystals", Acta Cryst. (1951) pp. 219-226.

Lampert, Carl, Chromegenic Switchable Glazing: Towards the Development of the Smart Window; Conference Proceedings of Window Innovations 1995, Jun. 5-6, 1995, Toronto, Canada.

Lampert, Carl, "Optical Switching Technology for Glazings", Thin Solid Films, vol. 236 (1993), pp. 6-13.

Korean Intellectual Property Office as International Searching Authority, International Search Report and Written Opinion for International Application No. PCT/US2009/041576, Nov. 25, 2009, 7 pages (P190981.PCT).

Notice of Allowance, U.S. Appl. No. 12/019,602, dated Jun. 9, 2010 (now Pat. 7,768,693).

Notice of Allowance, U.S. Appl. No. 12/172,156, dated Mar. 11, 2010 (now Pat. 7,755,829).

Sarychev, et al. Chapter 8 Plasmonic Nanowire Matamaterials. In Negative refraction metamaterials. (Wiley 2005, Edited by Eleftheriades et al.).

* cited by examiner

Figure 1  Xue, J. "Temperature Activated Optical Films"

Figure 2  Xue, J. "Temperature Activated Optical Films"

Figure 3    Xue, J. "Temperature Activated Optical Films"

Figure 4   Xue, J. "Temperature Activated Optical Films"

Figure 5  Xue, J. "Temperature Activated Optical Films"

TEMPERATURE ACTIVATED OPTICAL FILMS

CROSS-REFERENCE TO RELATED APPLICATIONS

This application claims priority from U.S. Provisional Patent Application No. 60/930,894, entitled "Temperature Activated Optical Films" filed on May 18, 2007, the contents of which are incorporated herein by reference.

BACKGROUND OF THE INVENTION

1. Field or the Invention

The present invention generally relates to a multilayer dielectric optical structure that selectively reflects a predetermined wavelength of electromagnetic radiation. More particularly, this invention relates to the optical structure whose change of optical property is activated by temperature.

2. Background of the Invention

Glass windows are widely used in residential and commercial buildings for the purpose of natural light collection as well as for aesthetic reasons. However, glass windows, as they are generally a thin and transparent barrier separating the interior for example an office space to the outside environment, can readily exchange heat with the outside environment via two paths: direct heat exchange due to thermal motions of air, and passage of electromagnetic radiation. The reduction of direct heat exchange due to thermal motion between an interior and external environment are generally always preferred. For electromagnetic radiation, there are two major contributions as far as heat exchange is concerned: the long wavelength radiation due to blackbody radiation of objects near room temperature, and the solar electromagnetic radiation. Similar to heat exchange due to thermal motion, the transfer of blackbody radiation due to objects near room temperature are generally not preferred as they present a heat loss due to interior in colder days (to colder environment) and heating of interior on hotter days from hotter external environment. However, heating due to solar radiation is a different matter. Although visible light in general are preferred to transmit through the windows to interior, the near infrared spectrum of solar radiation or the heat component of the solar spectrum are desirable only in colder days, and on a hot summer day, rejection of the solar heat is very much desirable.

To reduce the heat exchange due to thermal motion, double pane glass windows with an air gap or inert gas filled gaps or triple pane glass windows are often used. However, these windows do not reduce or increase solar heat gain, as they absorb or reflect only a very small and fixed amount of electromagnetic radiation in the visible and infrared range that are essentially purely due to Fresnel reflections.

Current techniques employed in reducing the passage of electromagnetic radiation via glass windows include the technique of coating a very thin layer or layers of material, for example, silver and silver nitride layers, that behaves nearly as a metal mirror for wavelengths of about 10 µm? electromagnetic radiation. Such coated windows are commonly known as low e or low emissivity windows, and reflect the long wavelength electromagnetic radiations back to the environment or interior of a building. Such coatings increase the heat insulation properties of windows at all temperatures.

Selective reflection and absorption of near infrared radiation is a mature technology with great commercial success. An example is Solarban 70XL coatings produced by PPG Industries, Inc. Such coatings block most of near infrared and partially visible light constantly, both in colder and warmer days.

However, it is desirable to have a window or a film that have high transmission of visible light; high transmission of infrared radiation when temperature is low; transition to high reflection of infrared radiation when temperature reaches certain level; the transition temperature is at room temperature range; the switching is automatic depending on the temperature; the window or film can be inexpensively mass producedand non-toxic.

3. Prior Arts

U.S. Pat. No. 3,279,327 to Ploke disclosed a multilayer optical filter for selectively reflecting infrared radiation while allowing visible light to transmit by means of interference.

U.S. Pat. No. 4,229,066 to Rancourt et al, disclosed a multilayer stack which is reflecting in the infrared and transmitting at shorter wavelengths. The stack is formed of a plurality of layers of high and low index materials with alternate layers being formed of materials having a high index of refraction and the other layers being formed of materials having a low index of refraction.

U.S. Pat. No. 3,711,176 to Alfrey et al, disclosed a multilayer films of polymer materials with sufficient mismatch in refractive indices, these multilayer films cause constructive interferences of light. This results in the film transmitting certain wavelengths of light through the film while reflecting other wavelengths.

U.S. Pat. No. 3,790,250 to Mitchell disclosed a system, where the conductivity of a light absorbing semiconductor varies with the temperature, and inversely, the light absorption or attenuation level is controlled by the temperature. The disclosed system show a light absorption of about 80% at 80° C. and the absorption is reduced to about 15% at room temperature. This system is not useful for present application because its temperature dependence changes slowly over a wide range of temperature.

U.S. Pat. No. 4,307,942 to Chahroudi disclosed a solar control system where various structure consisting of porous layers absorb the solvents or repel the solvents depending on the temperature and the structures change their optical properties from transparent to solar radiation at low temperatures to a metallic surface or a dielectric mirror to reflect solar radiation of predetermined wavelengths. A significant difficulty in implementing such a device, aside from any performance issues, is that there must be a significant reservoir to hold such solvents.

U.S. Pat. No. 4,401,690 to Greenberg disclosed a method for making thin films of vanadium oxide possessing such a transition with depressed transition temperature of 25° C. to 55° C., approaching but not quite the transition temperature needed in order that the material to be useful. In addition, vanadium oxides in temperatures below or above the transition temperature absorb a significant portion of visible light, which makes the technology less attractive for window applications.

U.S. Pat. No. 6,049,419 to Wheatley disclosed a dielectric multilayer structure consisting of birefringent polymer layers that will reflect at least one polarization of predetermined wavelengths. However, the optical properties including its reflectance will not change with the temperature, and the resulting optical structure will reject solar energy on a warmer summer day, which is desirable, as well as on a cold winter day if so designed, which is not desirable.

U.S. invention disclosure No. H001182 by Spry disclosed an optical filter structure using a material that has a ferroelectric phase to a non ferroelectric phase transition upon changing in temperature and another optically clear material that does not have the phase transition. The resulting optical filter structure can selectively block radiation of a predetermined wavelength, as the refractive index of the phase changing layer changes as temperature change. However, the transition temperature of ferroelectric materials occur at about 120° C., the induced index of refraction change is about 0.03, and as both layers are optically isotropic in the reflection mode at high temperature, the device will only reflect a nearly normal incident single wavelength light at very high temperatures, and it will require a large number of layers, greater than 5000 to achieve significant reflection across a broadband of near infrared radiations, therefore that will not be applicable for adjusting solar energy control at room temperature range.

Accordingly, the unfulfilled needs still exists in this art for a window or an optical film that have high transmission of visible light; high transmission of infrared radiation when temperature is low; transition to high reflection of infrared radiation when temperature reaches certain level; the transition temperature is at room temperature range; the switching is automatic depending on the temperature; the window or film can be inexpensively mass produced; the material used for such windows or films is non-toxic.

OBJECTIVES AND SUMMARY OF THE INVENTION

The present invention meets the needs by providing a multilayer dielectric optical structure that is made of polymer and liquid crystal materials. The optical structure is substantially transparent of visible and infrared light when temperature is below a transition temperature in the range between 15-35 degree Celsius, while have high reflectance of infrared light when temperature is above the transition temperature. The number of layers required to reflect a wide band of infrared light is between 100 to 1000 layers. A film or a window in accordance with the present invention is particularly useful for passive solar energy control since it has high visible light transmittance, significantly lower infrared transmittance above transition temperature, has a sufficiently low transition temperature range to be useful in a wide variety of climatic conditions, and the only activation required is the change in ambient temperature that the films or the windows can directly sense.

The following embodiments and objectives of therefore are described and illustrated in conjunction with systems, tools, and methods which are meant to be exemplary and illustrative, and not limiting in scope. In various embodiments, one or more of the above-described market desires have been met by the present invention, while other embodiments are directed to other improvements.

A primary objective of the present invention is to provide an optical structure that transmit visible lights and infrared radiation at a temperature below a characteristic transition temperature, reflect the infrared radiation when temperature is above the transition temperature, which the transition temperature is in the room temperature range.

Another objective of the present invention is to provide a flexible optical film structure where the film transmits the visible light at all temperatures but reflects the near infrared or heat generating spectrum of solar electromagnetic radiation above a desired temperature setting but allows the transmission of such solar heat at lower temperatures.

Another objective of the present invention is to provide a temperature dependent reflective polarizer film where above a predetermined temperature setting the film reflects one polarization of electromagnetic radiation of certain wavelength range in the visible and near infrared spectrum while transmitting the electromagnetic radiation with polarization substantially perpendicular to the reflected polarization in the spectral range, and transmitting electromagnetic radiation of all polarizations outside the spectral range. Below the predetermined temperature setting, the film is substantially transparent to the electromagnetic radiation of all wavelengths and polarization states in the visible and near infrared range.

Another principle objective of the present invention is to provide such an optical film that is plastic film based and that it is readily mass producible and can be readily retrofit into existing windows as well.

A further objective of the present invention is to provide an optical system that reflects a broadband of infrared radiation when temperature is above the transition temperature while it is transparent to visible light, transparent to both visible and infrared radiation when below the transition temperature.

Other objectives and advantages will be apparent from the following description of the invention.

BRIEF DESCRIPTION OF DRAWINGS

Exemplary embodiments are illustrated in referenced figures of the drawings. It is intended that the embodiments and figures disclosed herein be considered illustrative rather than limiting.

DETAILED DESCRIPTION OF THE PRESENT INVENTION

As used herein, "a" or "an" means one or more.

As used herein, "Polarization" means the orientation of the electric field oscillations in the plane perpendicular to the electromagnetic wave's direction of travel.

As used herein, "µm" means micro meter, $1/1000000$ of a meter in length.

As used herein, "µm" means nano meter, $1/1000000000$ of a meter in length.

As used herein, "birefringent" and "birefringence" means an optical material that shows different effective index of refraction along different directions.

As used herein, "Optical axis" and "optical axes" means the principal direction or directions of the index ellipsoid of a birefringent material. For biaxial birefringent materials, there are three mutually perpendicular optical axis. For uniaxial materials, typically only one axis, the direction along the extraordinary index of refraction is used.

As used herein, "refractive index along an optical axis" means a numerical number that measures how much the speed of light is reduced inside the medium when the electromagnetic radiation is polarized along the optical axis. For birefringent optical materials, there are three refractive indices along the three principal optical axes respectively. If all three refractive indices are same, is the material is isotropic. If two refractive indices are same, the material is uniaxial.

As used herein, "optical thickness" means the layers physical thickness times its refractive index. For birefringent material, optical thickness is direction dependent because of direction dependency of refractive indices.

As used herein, "transition temperature" or "Tc" means a temperature at which liquid crystal material undergoes a phase transition, from the isotropic state when above Tc, to an ordered or liquid crystalline state when below Tc.

Embodiments disclosed herein relate to a multi-layer dielectric optical structure, more specifically a polymer/liquid crystal smart optical plastic film that has a transition temperature Tc. Above Tc it reflects a specific spectral range of electromagnetic radiation in the near infrared spectrum but transmits the electromagnetic radiation outside this specific spectral range. Below Tc, the optical structure is substantially transparent to visible and infrared radiation. Specifically, in one preferred embodiment disclosed herein, the optical structure is designed to have optical plastic films reflecting near infrared radiation of wavelengths from 700 nm to 2500 nm at temperatures of 20° C. and above while transmitting such radiation at temperatures below the temperature of choice, but are substantially transparent to visible light of wavelengths from 400 nm to 700 nm at all time. This structure can be used for an optically clear film that utilizes solar heat when needed on a colder day or in a cold environment but rejects infrared radiation on hotter days. Such an optical film will find wide range of applications in architectural, vehicular, and other industries.

Figure 1:
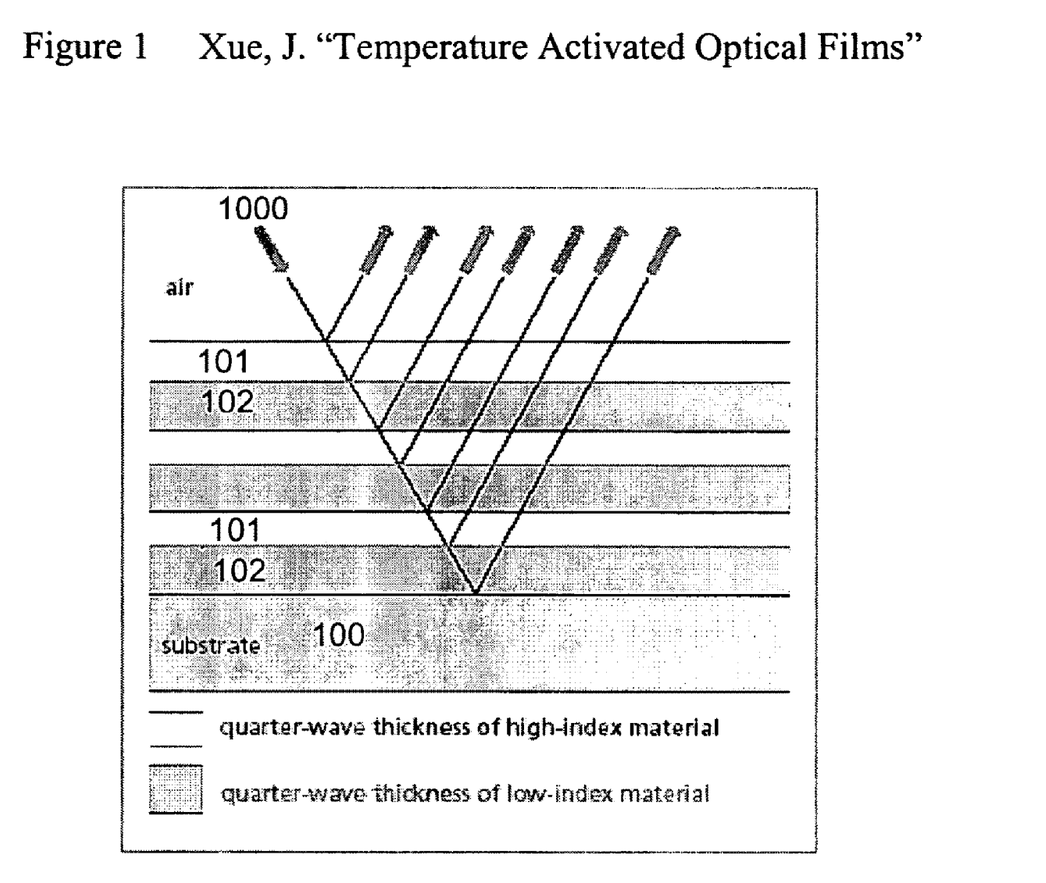
FIG. 1 is a schematic, illustrative view of a sectional a multilayered structure of the invention.

As shown in FIG. 1 a basic structure of a structured film that reflects a spectral range of electromagnetic radiation, for example at around wavelength of 10 µm, while transmitting other wavelengths of electromagnetic radiation. The film stack is composed of alternating layers of two optical materials, first optical layer 101 and second optical layer 102 on a plastic or solid substrate 100. At least one of the layers, 101 or 102, or both, is birefringent. In one preferred embodiments, alternating layers 101 are comprised of uniaxial birefringent optical plastic films with optical axis along the layer normal of the films, and the alternating layers 102 are comprised of discotic liquid crystals with director along the layer normal when the material is in discotic phase. The discotic liquid crystal have an isotropic to discotic phase transition temperature Tc at around room temperature. The films 102 comprising discotic liquid crystals maybe polymerized for mechanical stability. When below the Tc, the layers 102 are in discotic liquid crystal phases, and the indices of refraction of the layers 101 and 102 are substantially matched in all three principal directions, and the layer is transparent to electromagnetic radiation 1000 of all wavelengths and all polarizations of interest. Above the Tc, the films 102 are in isotropic phase with a homogeneous index of refraction that is preferably designed to substantially match that of layers 101 along the optical axis. The refractive indices of the layers in the layer plane directions are mismatched. The effective optical thicknesses of both layers are designed to be quarter wavelength thick of the electromagnetic radiation 1000 of wavelengths around $\lambda_0$, and reflections from interfaces are constructive. The reflection of the stack therefore peaks around the wavelength $\lambda_0$ with the reflectance and the bandwidth dependent on the ratio of the index of refraction and the number of layers, the ratio of the index of two materials is defined as higher refractive index $n_H$ divided by the lower one $n_L$, there is no reflection if the index ratio is 1, for birefringent optical materials, the ratio is also direction dependent. A larger index ratio requires less number of layers to achieve high reflectance and reflects a broader band of light, and a crude estimate show that to achieve close to 100% reflection at the peak wavelength, the number of required layers has to be greater than $1/(n_H-n_L)$, where $n_H$ and $n_L$ the indices of refraction of the high and low index optical films, respectively. Outside the peak wavelength band, the reflectance reduces, depending on the number of layers, and in oscillatory fashion.

One preferred embodiment as show in FIG. 1, the substrate is a clear polyester film available from a number of companies, including DuPont Teijin Films. The film thickness is in the range of 50 µm to 500 µm, preferably from 125 µm to 200 µm. The substrate can also be other clear plastic films, such as polyethylene films from same suppliers as polyester films, and with similar thickness.

On top of the substrate, we have liquid crystal layer 102. A mixture of liquid crystal and monomer additives are deposited onto the substrate. One example of the liquid crystal used for illustrative purposes is 6CB(4-cyano-4-hexylbiphenyl) available from Merck KGaA and with monomer additives bisacryloyl biphenyl and a small amount of benzoin-methylether as initiators, the concentration of monomer additives is up to 20% wt, preferably 0.3-5% wt. After depositing layer to thickness of 271 nm, monomers were polymerized by exposed to a UV light, commonly known as photopolymerization method, forming a polymer mesh in the layer for the purpose of dividing liquid crystal material into small sections with less mobility and add to mechanical stability of the layer to maintain uniform thickness of the layer.

A polymer layer 101 is deployed on top of liquid crystal layer for sealing the layer and as the next, alternating polymer layer. The material for layer 101 is semi-crystalline polymer, such as polyethylene terephthalate (PET) or polyethylene naphthalate (PEN). Biaxially stretched thin PET films as thin as 0.5 µm are readily available from suppliers such Goodfellow Corporation, Toray Industry, Inc., These films can be further stretched at temperatures of about 140° C. to at least get films as thin as about 0.25 µm. For a uniaxially stretched PET film, the indices of refraction depend on the stretching ratio. If the stretching ratio is 5 times, that is, the film length is 5 times that of the pre-stretching length, the three refractive indices are 1.70, 1.55, 1.50 along the stretching, in the film plane but perpendicular to the stretching direction, and along the film normal direction respectively. The optical thickness along the stretching direction of such a 0.25 µm thick layer is 0.425 µm and will reflect infrared radiations peaked at 1.7 µm in wavelength when paired with another optical material whose optical thickness is ¼ wavelength at the same wavelength. Uniaxially and uniformly stretched PET films as thin as about 0.05 µm in thickness can be prepared which give optical thicknesses along the stretching or ordering direction of 0.085 µm. Such uniformly stretched films, when stacked with alternating liquid crystal layers in isotropic phase with lower refractive index, will allow for constructive reflections of radiations with center wavelength peaked as short as at 340 nm, therefore our preferred interest range 700 nm to 2500 nm is easily achievable.

Figure 2:
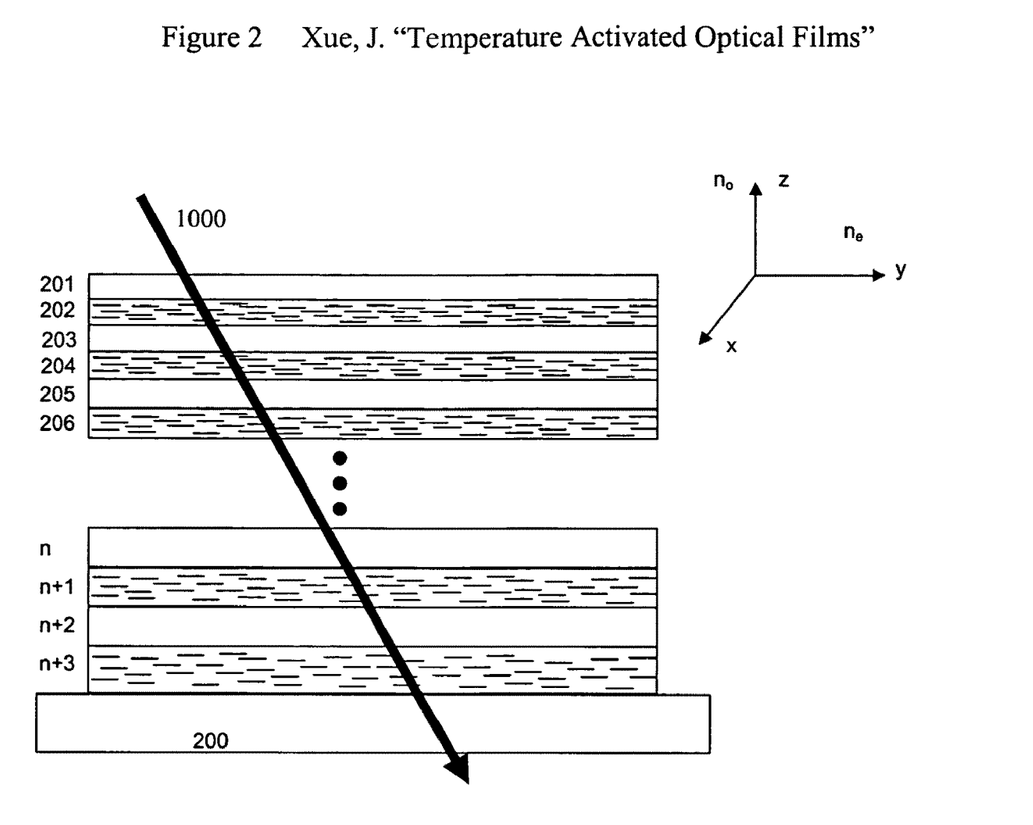
FIG. 2 is a schematic, illustrative view of a stretched polymer and liquid crystal align along stretch direction.

In another preferred embodiment as shown in FIG. 2, the multilayer stack is comprised of birefringent polymer layers 201, 203, 205, . . . , n, n+2 such as a stretched polyethylene terephthalate and liquid crystal layers 202, 204, . . . n+1, n+3 such as liquid crystal 6CB on a base substrate 200. The liquid crystal molecules are rod-shaped. In the nematic liquid crystal or higher ordered liquid crystal or crystal phases, the material is uni-axial or biaxial in optical properties, and is isotropic when in isotropic phase. When stretched along the y axis as shown in FIG. 2, the polymer layer is generally uniaxial optically with its optical axis along the stretching direction of y axis and with ordinary index of refraction $n_o$ along the x and z direction and extraordinary index of refraction $n_e$ along the stretching y direction. Furthermore, the stretched polymers act as alignment layers for liquid crystals that enable the polymer films to align liquid crystal directors along the stretching direction.

According to the present invention, at low temperatures where the liquid crystal layers are in nematic liquid crystal or higher ordered phases, the indices of refraction and the thicknesses of the polymer layers and the liquid crystal layers do not satisfy the Bragg interference conditions, preferably, the indices of refraction of the polymer and liquid crystal materials are substantially matched in at least x and y directions. The film stack is therefore transparent to incident light 1000 in all wavelengths and all polarizations in the visible and near infrared spectrum that is of interest in this invention. 6CB, the nematic to isotropic phase transition temperature is 29° C. At about 13° C. $n_x = n_z = n_o = 1.53$, and $n_y = n_e = 1.71$, substantially matching the indices of the polymer layer.

Figure 3:
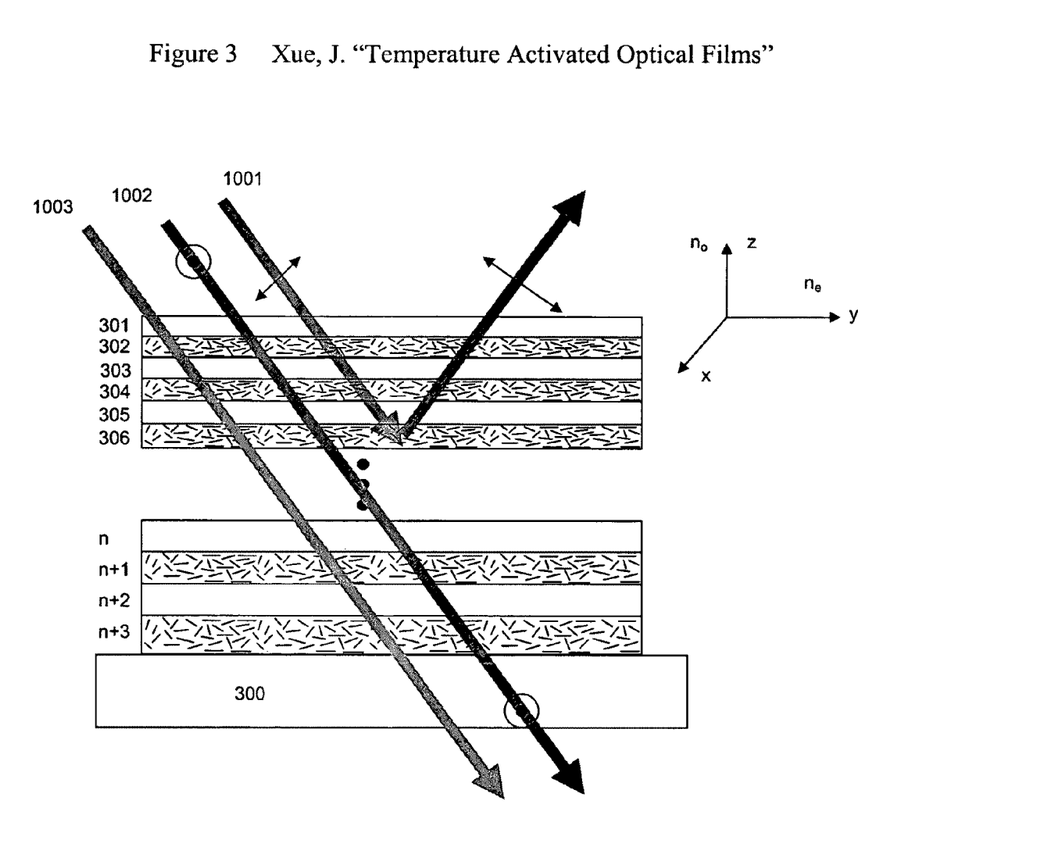
FIG. 3 is schematic, illustrative view of certain polarization is reflected when above transition temperature.

At temperatures above the liquid crystal to isotropic phase transition temperature, the liquid crystal layers 302, 304, . . . , 3+1, n+3 becomes isotropic and the indices of refraction of liquid crystal becomes isotropic with $n_x = n_y = n_z = n_{lc}$, which in general is close to be the same as the ordinary index of the liquid crystals in their liquid crystal phases, as shown in FIG. 3. The liquid crystal layers thus are substantially index matched with the polymer layers 301, 303, . . . , n, n+2 in the x and z direction but are mismatched in the y or, in the case of stretched polymer films, the polymer stretching direction. For s-polarized incoming light 1002 (polarization along x-axis), the indices for the polymer layers and liquid crystal layers are substantially matched and thus the film stack is transparent to the incoming light. For p-polarized incoming light, the effective indices of polarization in the polymer layers and in the isotropic liquid crystal layers are different.

In one example, an alternating PET film and liquid crystal 6CB has shown the following parameters and properties:
PET film thickness: 0.25 μm, uni-directionally stretched.
6CB layer thickness: 0.271 μm
Number of layer pairs N=22
Transition temperature: 29° C.
Transmisivity of near infrared spectrum: (1700 nm) at T>29° C., 6.5%
Transmisivity of the near infrared radiation at T<20° C. and radiation at other wavelengths for all temperatures: 90%

According to the embodiments disclosed herein, at temperatures above the liquid crystal to isotropic phase transition temperature, the thicknesses of the layers 301, 302, 303 . . . are designed such that a specific wavelength range of p-polarized electromagnetic radiation 1001 is reflected by the layer. In one specific embodiment, the film stack shown in FIG. 3 is designed to only substantially reflect p-polarized near infrared electromagnetic radiation of wavelengths from 700 nm to 2500 nm when the liquid crystal films 302, 304, . . . are in isotropic phase but to transmit the visible light 1003 and s-polarized near infrared electromagnetic radiation 1002. In another preferred embodiment, the film is designed to only substantially reflect a narrower spectrum range, for example, from 1000 nm to 1500 nm of p-polarized electromagnetic radiation when the liquid crystal layers are at higher temperature and in isotropic phase.

In the preferred embodiment, broadband spectrum reflection at high temperature by the films disclosed in FIG. 1 and FIG. 2 and FIG. 3 are achieved by varying the thickness of the films such that the center wavelength of constructive reflection gradually varies across the film. Thus the thickness of layer 301 is different from the thickness of layer 303 and further the thickness of both layers may be different from that of the layer n in the film stack. In another preferred embodiment, films reflecting specific but different ranges of electromagnetic radiation are stacked together to broaden the overall reflecting spectral range of the film stack.

In one preferred embodiment, a multilayer optical film is formed by a stack of dielectric layer pairs with slightly variant optical thickness. A dielectric pair is formed by one polymer layer and a matching liquid crystal layer. The formed multilayer polymer and liquid crystal structure is then subject to a unidirectional mechanical stretching. Above Tc, the stretched multilayer structure satisfies the condition that both layers in the pair have same optical thickness that equals to ¼ of a representative nominal wavelength. The relationship between each adjacent layer pairs is in accordance to the formula: $d_{N+1} = r \, d_N$, where $d_N$ is the optical thickness of pair N, r is a numerical factor in the range of 0.85 to 0.999, where $d_1 = \frac{1}{4}\lambda_0$, where $\lambda_0$ is the nominal wavelength substantially the same as the upper wavelength limit of the broadband of interest. Preferably for a broadband near infrared reflecting device, $\lambda_0$ is in the range of 1500 nm to 2500 nm. The multilayer structure so formed reflects a broadband of infrared radiation. Number of layers required in our example is not very large due to the large difference in refractive indices at liquid crystal transition temperature, as shown in the following example:

An alternating PET film and 6CB has shown the following parameters and properties:
PET film thickness: 0.1 μm-0.345 μm, uni-directionally stretched.
6CB layer thickness: 0.128 μm-0.416 μm
Transition temperature: 29° C.
Number of layer pairs N=115
$\lambda_0$=2400 nm
Transmisivity of visible lights (wavelength 400 nm to 700 nm) at T>29° C., 80%
Trasmisivity of near infrared spectrum: (700 nm-2500 nm) at T>29° C., 55%
Trasmisivity of visible lights at T<20° C., 93%
Trasmmisivity of near infrared radiation at T<20° C., 93%

Figure 4:
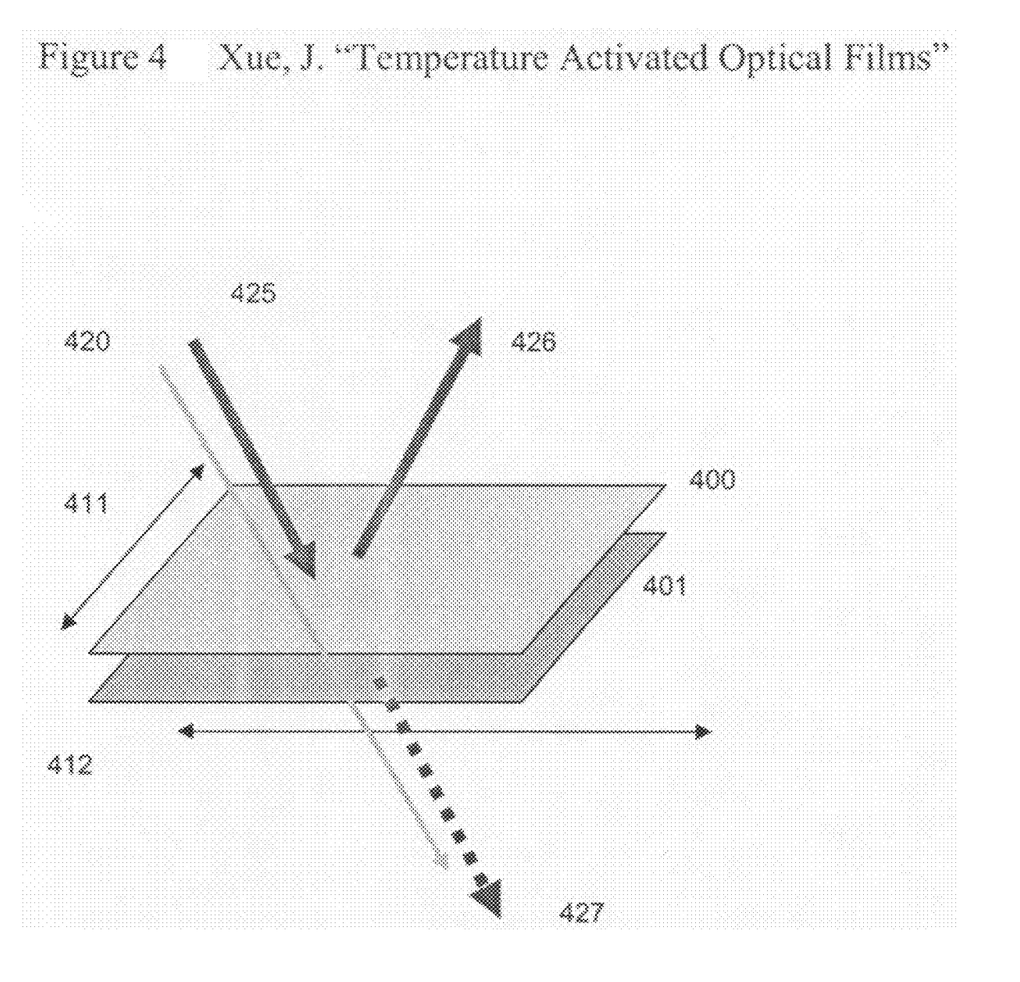
FIG. 4 is schematic, illustrative view of two identical reflecting film stacked together with perpendicular optical axes, forming a pair complete reflect certain wavelength at above transition temperature.

In another preferred embodiment disclosed in FIG. 4, two optical films 400 and 401 of type disclosed in FIG. 2 and FIG. 3 are stacked together with there optical axes 411 and 412 substantially perpendicular to each other to form a composite film that reflect all polarizations of light in the desired spectral range of electromagnetic radiation at high temperatures while transmitting the same at low temperatures. The composite film transmits electromagnetic radiation outside the spectral range at all temperatures. In one preferred embodiment, the visible incoming light 420 is transmitted by the composite film at all temperatures. However, for the near infrared incoming light 425, the composite film reflects it to 426 at high temperatures when the liquid crystal layers are in isotropic phase and transmits it to 427 at low temperatures when the liquid crystal layers are in nematic liquid crystal or higher ordered phases.

Figure 5:
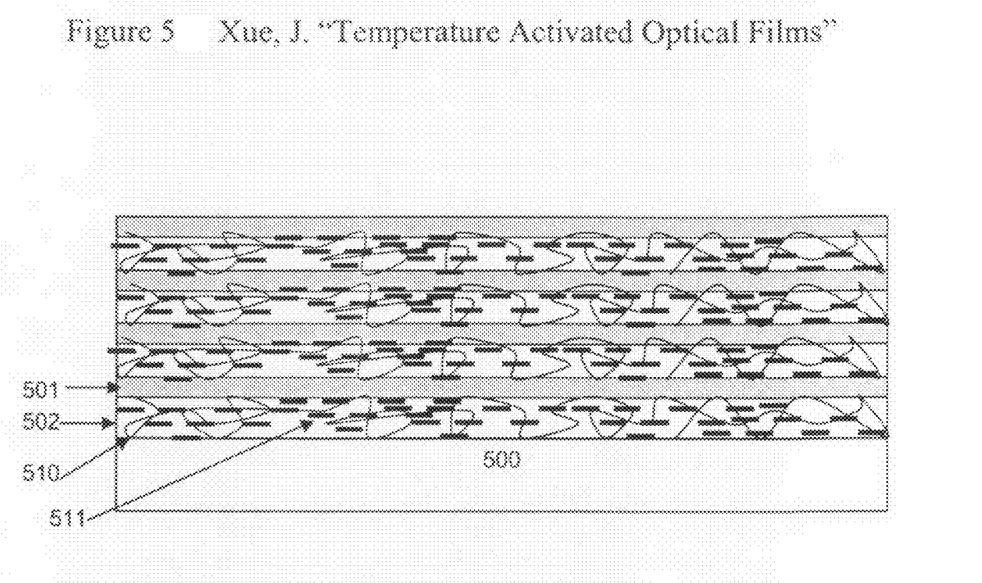
FIG. 5 is a schematic, illustrative view of a polymer mesh network for containing liquid crystal and mechanical structure stable.

One specific property related to liquid crystal is its ability to flow. In a preferred embodiment, polymerizable monomers are doped in liquid crystal layers 502. The doped monomers may be photo-polymerized to form a network 510 that forms a containing mesh for liquid crystal molecules 511, as shown in FIG. 5. Alternatively monomers may be polymerized by heating the liquid crystal monomer mixture to form the network 510. Such network 510 will form a three dimensional mesh that result in a mechanically stable liquid crystal film. In another preferred embodiment, the liquid crystal layers are comprised of polymer liquid crystals with polymer backbones to provide rigidity and mechanical stability to the liquid crystal layer. In yet another preferred embodiment, the polymerizable monomers form thin closed walls and the liquid crystals are contained within these walls wherein the mobility of the liquid crystals is limited.

Although liquid crystal molecules are disclosed in this invention as the temperature sensitive optical material, various types of other optical materials with refractive index sensitive to temperature can be incorporated into present invention, so long as the refractive index of the optical materials experience a significant, greater than 0.05 change when the temperature of the film is changed over a narrow range, particularly when the temperature change occurs near the room temperature.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein. It is therefore intended that the following appended claims and claims hereafter introduced are interpreted to include all such variations, modifications, permutations, additions, and sub-combinations as are within their true spirit and scope.

What is claimed is:

1. A multilayer dielectric optical structure, for selectively reflecting a predetermined wavelength, comprising:
a transparent substrate;
a plurality of alternating first layers and second layers on the substrate, wherein the first layers comprise a first optical material having a first optical axis and a first refractive index along the first optical axis, and wherein the second layers comprise a second optical material having a second optical axis and a second refractive index along the second optical axis below a characteristic transition temperature (Tc) and a third refractive index above the Tc, wherein the second optical material includes a liquid crystal material having an isotropic-to-ordered state transition temperature between 15 and 35 degrees Celsius, wherein the first and second optical axes are substantially parallel and the first and second refractive indices are substantially equal, and wherein the third refractive index differs from the second refractive index and from the first refractive index; and
wherein the optical thickness of each of the first layers is equal to ¼ times the predetermined wavelength and the optical thickness of each of the second layers is equal to ¼ times the predetermined wavelength when the temperature is above the Tc.

2. The optical structure of claim 1, wherein one optical axis of the first layer is parallel to the layer surface.

3. The optical structure of claim 1, wherein the third refractive index differs from the second refractive index by 0.05 or greater.

4. The optical structure of claim 2, wherein the first optical material comprises semicrystalline polymers.

5. The optical structure of claim 2, wherein the first optical material includes polyethylene terephthalate.

6. The optical structure of claim 1, wherein the first optical material is a photo-polymerizable material.

7. A multilayer dielectric optical structure, for selectively reflecting a predetermined wavelength, comprising:
a transparent substrate;
a plurality of alternating first layers and second layers on the substrate, wherein the first layers comprise a first optical material having a first optical axis and a first refractive index along the first optical axis, and wherein the second layers comprise a second optical material having a second optical axis and a second refractive index along the second optical axis below a characteristic transition temperature (Tc) and a third refractive index above the Tc, wherein the second layer includes a polymer mesh at less than 10 weight % for maintaining mechanical stability and for limiting mobility of a liquid crystal material, wherein the first and second optical axes are substantially parallel and the first and second refractive indices are substantially equal, wherein the third refractive index differs from the second refractive index and from the first refractive index; and
wherein the optical thickness of each of the first layers is equal to ¼ times the predetermined wavelength and the optical thickness of each of the second layers is equal to ¼ times the predetermined wavelength when the temperature is above the Tc.

8. The optical structure of claim 7, wherein the polymer mesh is substantially the same material as the first optical material.

9. The optical structure of claim 7, wherein the polymer mesh is a photo-polymerized polymer.

10. The optical structure of claim 7, wherein the polymer mesh is a thermosetting polymer.

11. The optical structure of claim 1, wherein the liquid crystal material is in a nematic liquid crystal phase below the Tc and an isotropic phase above the Tc.

12. The optical structure of claim 1, wherein one optical axis of the first layer is perpendicular to the layer surface and the liquid crystal material is in a discotic liquid crystal phase below the Tc and an isotropic phase above the Tc.

13. The optical structure of claim 1, wherein the first optical material is isotropic.

14. The optical structure of claim 1, wherein the number of first layers is between 1 and 1000.

15. The optical structure of claim 1, wherein the first layer is a stretch-induced optically anisotropic material.

16. A multilayer dielectric optical system, comprising:
a transparent substrate;
a plurality of dielectric pairs, wherein each pair comprises a first layer of a first optical material having a first refractive index and a liquid crystal layer having a third isotropic refractive index when temperature is above a transition temperature, wherein the optical thickness of the first layer equals the optical thickness of the liquid crystal layer which equals ¼ of a predetermined wavelength $\lambda_0$, wherein the number of dielectric pairs is between 1 to 500; and
the optical thickness of each adjacent pair is in accordance to the formula:

$$d_{N+1} = r\, d_N$$

first layer $= \frac{1}{4}\lambda_0$
where $d_N$ is the optical thickness of Nth pair, it is the two times the optical thickness of each layer in the pair and r is a numerical number between 0.85 to 0.999.

17. The optical structure of claim 1, wherein the second layer includes a polymer mesh at less than 10 weight % for maintaining mechanical stability and for limiting the mobility of the liquid crystal material.

18. The optical structure of claim 17, wherein the polymer mesh is substantially the same material as the first optical material.

19. The optical structure of claim 17, wherein the polymer mesh is a photo-polymerized polymer.

20. The optical structure of claim 17, wherein the polymer mesh is a thermosetting polymer.

* * * * *